United States Patent
Schulnig

(10) Patent No.: US 10,865,055 B2
(45) Date of Patent: Dec. 15, 2020

(54) GRIPPER ARM FOR CONTAINERS AND GRIPPER DEVICE HAVING SUCH GRIPPER ARMS

(71) Applicant: Tyrolon-Schulnig GmBH, Hochfilzen (AT)

(72) Inventor: Ludwig Schulnig, St. Jakob in Haus (AT)

(73) Assignee: Tyrolon-Schulnig GmbH, Hochfilzen (AT)

( * ) Notice: Subject to any disclaimer, the term of this patent is extended or adjusted under 35 U.S.C. 154(b) by 0 days.

(21) Appl. No.: 16/474,869

(22) PCT Filed: Jan. 10, 2017

(86) PCT No.: PCT/EP2017/050383
§ 371 (c)(1),
(2) Date: Jun. 28, 2019

(87) PCT Pub. No.: WO2018/130266
PCT Pub. Date: Jul. 19, 2018

(65) Prior Publication Data
US 2019/0322466 A1 Oct. 24, 2019

(51) Int. Cl.
*B65G 47/90* (2006.01)
*B67C 3/24* (2006.01)

(52) U.S. Cl.
CPC .............. *B65G 47/90* (2013.01); *B67C 3/242* (2013.01); *B65G 2201/0244* (2013.01)

(58) Field of Classification Search
CPC .. B65G 47/90; B65G 2201/0244; B67C 3/242
See application file for complete search history.

(56) References Cited

U.S. PATENT DOCUMENTS

| | | | | |
|---|---|---|---|---|
| 5,743,377 A | * | 4/1998 | Kronseder | B65G 47/847 198/470.1 |
| 5,893,700 A | * | 4/1999 | Kronseder | B08B 9/426 198/803.9 |
| 6,959,953 B2 | * | 11/2005 | Graffin | B67B 3/206 198/470.1 |
| 8,672,376 B1 | | 3/2014 | Wilson et al. | |

(Continued)

FOREIGN PATENT DOCUMENTS

| | | |
|---|---|---|
| DE | 195 42 337 A1 | 5/1997 |
| DE | 299 15 927 U1 | 2/2000 |
| KR | 101 186 256 B1 | 9/2012 |

*Primary Examiner* — Stephen A Vu
(74) *Attorney, Agent, or Firm* — Cesari and McKenna, LLP

(57) ABSTRACT

A gripper arm for a device for gripping, holding and guiding bottle-like containers having a bore to support a bearing pin to pivotably fix the gripper arm in the device and including an energy store for moving a gripping section of the gripper arm by a control cam from an open position into a gripping position and vice versa, wherein the energy store is spring tongue integrally formed on the gripper arm and elastically deflectable so as to operatively engage the spring tongue of another gripper arm of the device in a mirror-inverted configuration. The gripper arms produced from a fiber-reinforced plastic, so as to remain sufficiently free of contaminants and germs, and be easily cleaned as well as being faster and easier to produce.

19 Claims, 4 Drawing Sheets

(56) References Cited

U.S. PATENT DOCUMENTS

Figure 1:
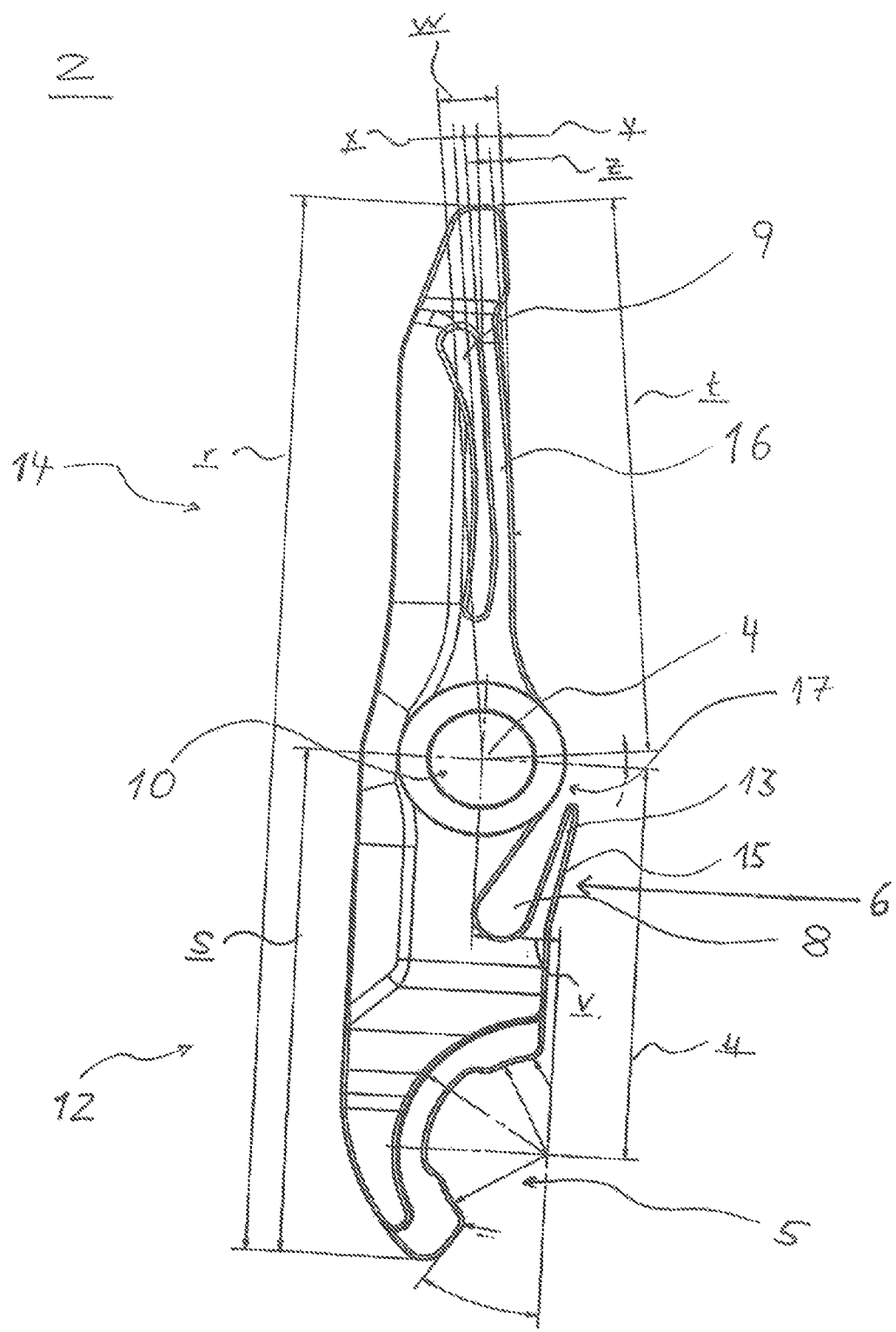

| | | | |
|---|---|---|---|
| 8,833,824 B2* | 9/2014 | Fahldieck | B65G 47/847 |
| | | | 294/90 |
| 8,894,114 B2* | 11/2014 | Fahldieck | B67C 3/242 |
| | | | 294/90 |
| 9,353,905 B2* | 5/2016 | Gruson | F16M 13/02 |

* cited by examiner

GRIPPER ARM FOR CONTAINERS AND GRIPPER DEVICE HAVING SUCH GRIPPER ARMS

CROSS REFERENCE TO RELATED APPLICATIONS

This application is the National Stage of International Application No. PCT/EP2017/050383, filed Jan. 10, 2017. The contents of this application is hereby incorporated by reference in its entirety.

TECHNICAL FIELD

The present disclosure relates to a gripper arm for a device for a gripping, holding, and guiding in particular bottle-like containers as well as a gripping device having such gripper arms.

The present invention relates to a gripper arm for a device for gripping, holding and guiding in particular bottle-like containers as well as a gripping device having such gripper arms. The gripper arm thereby forms a part of a device which comprises a control means for moving a gripping section of the gripper arm from an open position into a gripping position or vice versa. The gripper arm itself comprises a bore for the supporting of a bearing pin for pivotably fixing the gripper arm in the device and an energy store for the moving of the gripping section of the gripper arm from the gripping position into the open position or vice versa.

To be understood by the term "container" in the following is particularly, albeit not exclusively, a bottle-like container; i.e. for example glass or plastic beverage bottles, but also vials for pharmaceuticals or perfume. Likewise falling under the term are other glass or plastic containers which, similar to a bottle, exhibit in particular a neck or a structure which tapers to the opening.

Such a gripper arm is basically known from the prior art and is utilized in the production line processing of containers. Particularly during cleaning, filling or sealing, the containers are gripped at an entry point station by means of a gripping device having at least one pair of gripper arms and then transported to the next station within the process.

Such a device is disclosed for example in the WO2006/089610 patent application publication. The gripping device described therein, referred to as a "clamp grip" therein, is intended for a container transport system, whereby the gripping device has two gripper arms and can switch between a gripping position and an open position. The release or respectively opening process of the gripping device; i.e. the switching from the gripping position to the open position of the gripper arms, requires an opening means, e.g. in the form of a spiral spring or a repelling pair of magnets which exerts a force on the two gripper arms, whereby the gripping device thereby opens. The gripper arms normally have a predefined initial position to which they return automatically when there is no force from a control unit acting on them. As is also generally known from the prior art, the control unit is thereby implemented as a mechanically operating control cam, the force of which and thus predominantly also the deflection of the gripper arms is balanced or respectively cushioned by a spring means in the form of a leaf spring attached to each gripper arm. The spring means thereby aids the gripper arms in compensating for material tolerances of containers to be gripped or gripping reach deviances caused by a crooked container and thereby enables a secure grip and prevents damage to the container.

A similar and likewise known gripping device is described in the German utility model specification DE 20 2005 002 924 U. A spring is used therein as an opening means for opening a pair of gripper arms.

In non-dust-free environments, however, the above-cited prior art gripping devices come with hygienic problems, which prove disadvantageous particularly when used in hygiene-sensitive sectors such as the bottling of beverages, juices or baby food. Because the above-described individual parts of a gripper arm known from the prior art, in particular the spiral spring and the leaf spring with their respective means of mounting, but also the magnets to be employed, collect dust and/or other contaminants, unwanted germs can thereby accumulate.

The number of individual gripper arm parts is likewise disadvantageous in terms of both manufacture and assembly as well as maintenance and cleaning. Logistical orders and deliveries thereby need to be made in order to obtain all the components and complete or respectively service the gripper arm. Moreover, additional assembly steps are required to assemble the gripper arm.

The invention is based on the task of providing a gripper arm which can easily be kept free of contamination and germs and has as few individual parts as possible.

The task posed is solved in an aforementioned gripper arm by the energy store comprising a spring tongue which is integrally formed on the gripper arm and elastically deflectable, which is or comes into operative engagement with the spring tongue of a device gripper arm of mirror-inverted configuration.

The term "integral" is understood in particular as being integrated or cohesive. The term "spring tongue" is understood in particular, but not exclusively, as an elastic or spring-loaded end piece which is flexible along at least a part of its length due to its material and/or structural nature and which returns/reverts back to an initial/home position in the absence of any external application of force. One end of the spring tongue is thereby of open or respectively non-attached configuration and the opposite end affixed or formed to an object, in the present case the gripper arm. The spring tongue preferably has only one degree of bending freedom; i.e. the spring tongue can essentially only bend along one plane. The spring tongue is thereby preferably designed to evenly deflect substantially the entire width regardless of the location of the force exerted on the spring tongue and thus no, at least no considerable, twisting occurs along the spring tongue axis or length respectively. Thus, the spring tongue acting as an energy store operates more stably when actively engaged and effects a force onto or away from the gripper arm in the tensioned or deflected state.

The separate springs or magnet pairs regularly employed in conventional gripper arms are thus dispensed with, whereby a substantially more hygienic, one-piece configuration to the gripper arm without contaminant-attracting cross holes, blind holes or similar accommodations for energy stores can be achieved. This goes hand in hand with a considerable reduction in manufacturing costs and maintenance and repair vulnerability since there is no longer a need for the conventional energy stores with the necessary assembly steps on the gripper arm. As a result, the number of structural components to a gripper arm and the contact surfaces for germs and contamination such as, for example, surface depressions and grooves, are considerably reduced.

In one advantageous configuration of the invention, the spring tongue comprises an end piece and a spring tongue ridge which tapers to the end piece. The spring tongue is thereby of sufficiently flexible and simultaneously stable arrangement or respectively configuration on the gripper arm during bending so as to prevent premature material cracks or breaks. Moreover, due to its elastic flexibility, the spring tongue ridge essentially takes over the function of the energy store while the end piece is of stable and/or rigid enough design so as to direct and exert or respectively transmit force without fluctuation.

So that the spring tongue can serve as closure means for the gripper arm pair, the spring tongues of the two gripper arms need to be connected together. The spring tongue, in particular its end piece, advantageously comprises a slot (or also notch/cut) to this end which is configured to come into operative engagement with a spring tongue, in particular its groove, of a mirror-inverted gripper arm of the gripping device. The operative engagement can thereby be configured in particular as a cross-lap joint.

Likewise proving advantageous is for the spring tongue to have substantially the same width in the axial direction of the bore as the gripper arm. The spring tongues are thus not able to slip off each other so readily and lose their operative engagement.

Preferably, the spring tongue, in particular its end piece, is spaced at a distance from a side surface of the gripper arm facing the mirror-inverted gripper arm in the relaxed or non-deflected state. This advantageous configuration enables the spring tongue to be able to serve as opening means since it can be deflected toward the gripper arm, particularly its side surface.

In order to be able to use different control means able to act either on the front section or the end section of the gripper arm, the energy store is configured between the bore and the gripping section and/or between the bore and an end section of the gripper arm.

Manufacturing the subject matter from plastic is inexpensive and quick. The gripper arm is therefore advantageously produced in one piece from in particular fiber-reinforced plastic and can thus be used immediately in a gripping device. The fiber reinforcement enables a fiber-reinforced plastic compound of high specific rigidity and strength. Conventional gripper arms consist of stainless steel and are therefore relatively expensive. Moreover, it has been seen during the operation of the devices in question that metallic gripper arms occasionally bend, which is on the one hand difficult to discern when the device is in operation and which on the other hand can lead to damaging the container to be grasped and transported and/or the oppositely disposed gripper arms transferring/receiving the container and/or other fittings. If, however, the gripper arms are made from plastic, they can be produced very inexpensively as a disposable item by injection molding. Furthermore, plastic has better properties for this application than stainless steel such that an overloading of the gripper arm does not lead to bending but rather to immediate fracture, which does not involve subsequent damage to the bottle and enables immediately identifying the overloaded gripper arm. Because of its one-piece configuration, the gripper arm can then be replaced very quickly and economically. Likewise, unlike metal or stainless steel as conventionally used, plastic barely shows any signs of wear from cleaning with water. A gripper arm formed from plastic results in an easily replaceable product able to be removed without difficulty after wearing out and replaced without significant costs or lead times and without long stoppage of the system which incorporates the gripping device as a component part.

In a further advantageous configuration, the gripping section exhibits a tapered and/or stepped profile from the lower side to the upper side of the gripper arm. This has the advantage of bottlenecks and in particular bottles being able to be grasped below the ring or collar of their neck and thus stably transported.

Preferably, the gripper arm comprises a spring bar which is integrally formed on the gripper arm and elastically deflectable to compensate the force and/or deflection from the control means, whereby the spring bar forms a closed circumferential recess with the gripper arm.

The invention likewise relates to a gripping device having at least one pair of a gripper arm according to one of the aforementioned claims and a gripper arm of mirror-inverted configuration and a control means for moving a gripping section of the gripper arm from an open position into a gripping position or vice versa.

Further advantageous configurations of the embodiments of the gripper arm and gripping device will be described in the following:

The control means/unit can, as described above, also be configured as a control cam between a pair of gripper arms. Depending on its positioning, it thereby acts either as an opening means (positioning between bore and gripping section) or as a closure means (positioning between bore and end section) of the gripping device.

Alternatively, the gripper arm can be directly actuated via the bearing pin when the gripper arm is arranged in rotationally secure manner on the bearing pin. To that end, a lever is configured at the upper or lower end of the rotatably mounted bearing pin, the actuation or respectively rotation of which can simultaneously pivot the gripper arm. The mirror-inverted gripper arm is thereby synchronously actuated by its own lever or by a toothed element of the bearing pin in operative engagement with a toothed element of the other bearing pin.

Depending on whether the control means is configured as opening means or closure means, the energy store acts as reverse closure means or opening means in order to automatically bring the gripping device into an initial position. The initial position can either be the gripping position or the open position depending on the function of the energy store.

The spring tongue can be of straight or curved configuration and directed toward either the end section or the gripping section of the gripper arm. Since the spring tongues, in particular their end piece, substantially rest against the gripper arm in e.g. the gripping position, the elastic spring force can thus be increased by the spring tongue being directed farther away from the gripper arm or the end piece being further distanced from the side surface of the gripper arm in the non-deflected or respectively unbent state.

Figure 2:
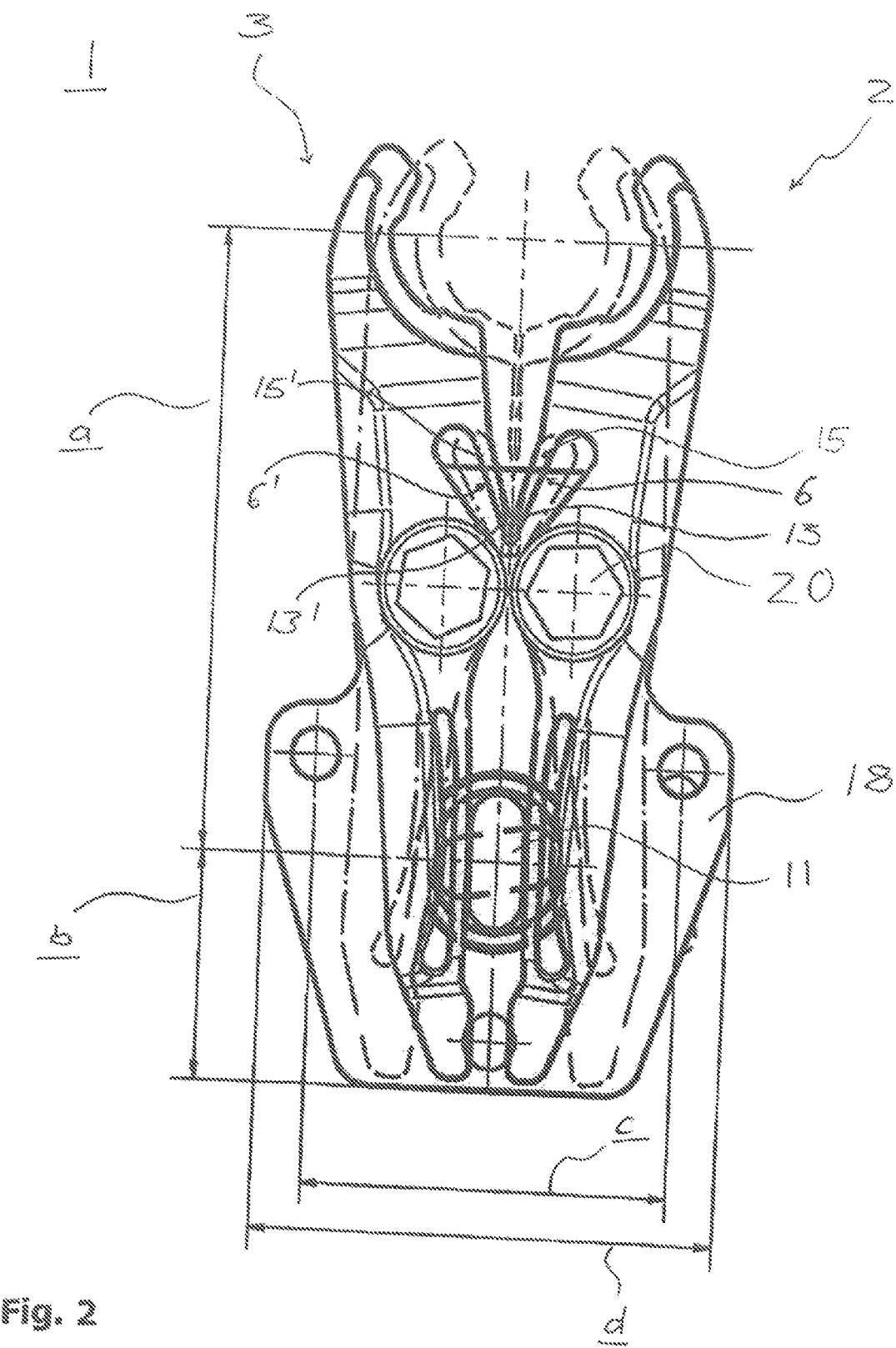
Figure 3:
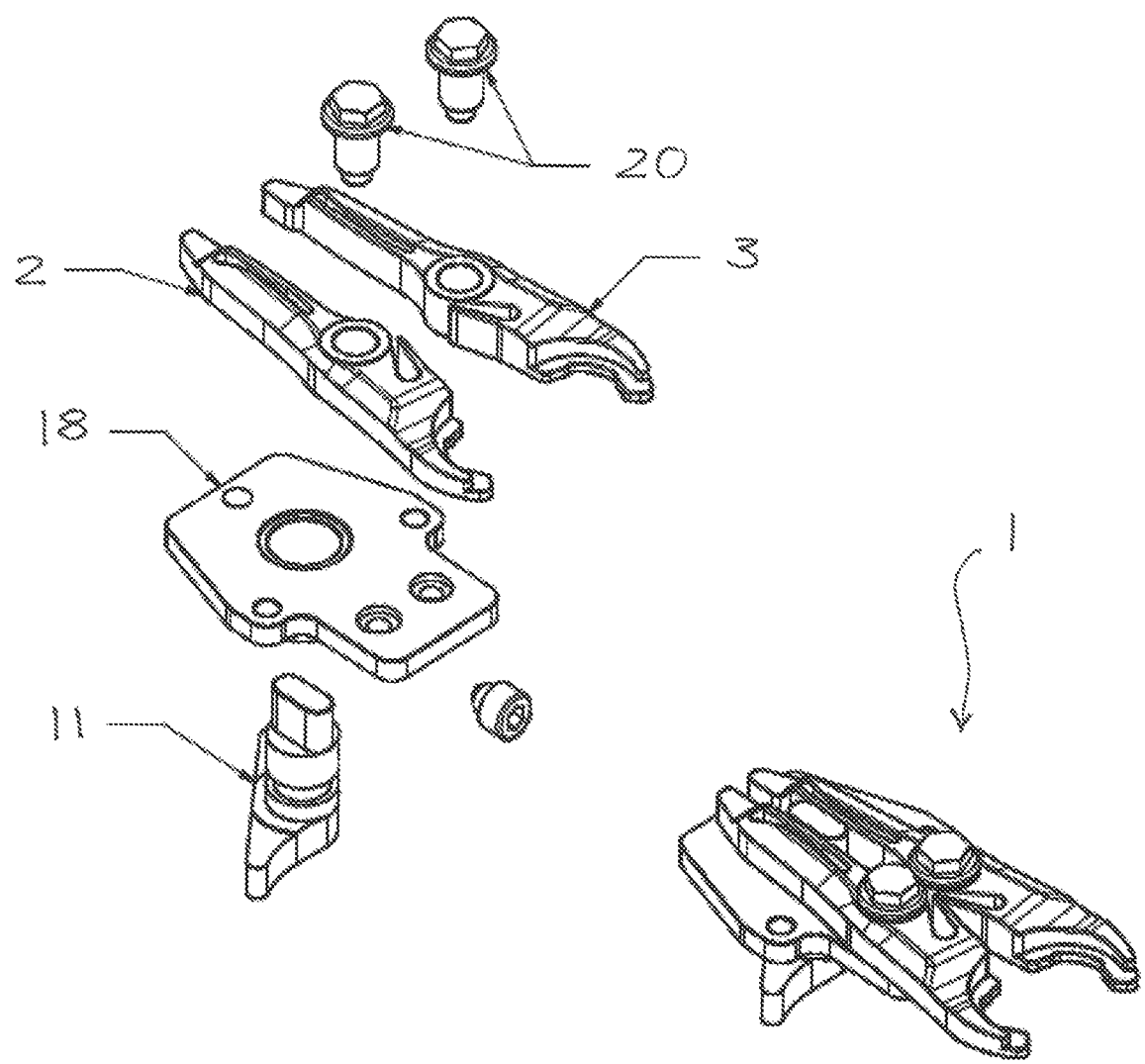
Figure 4:
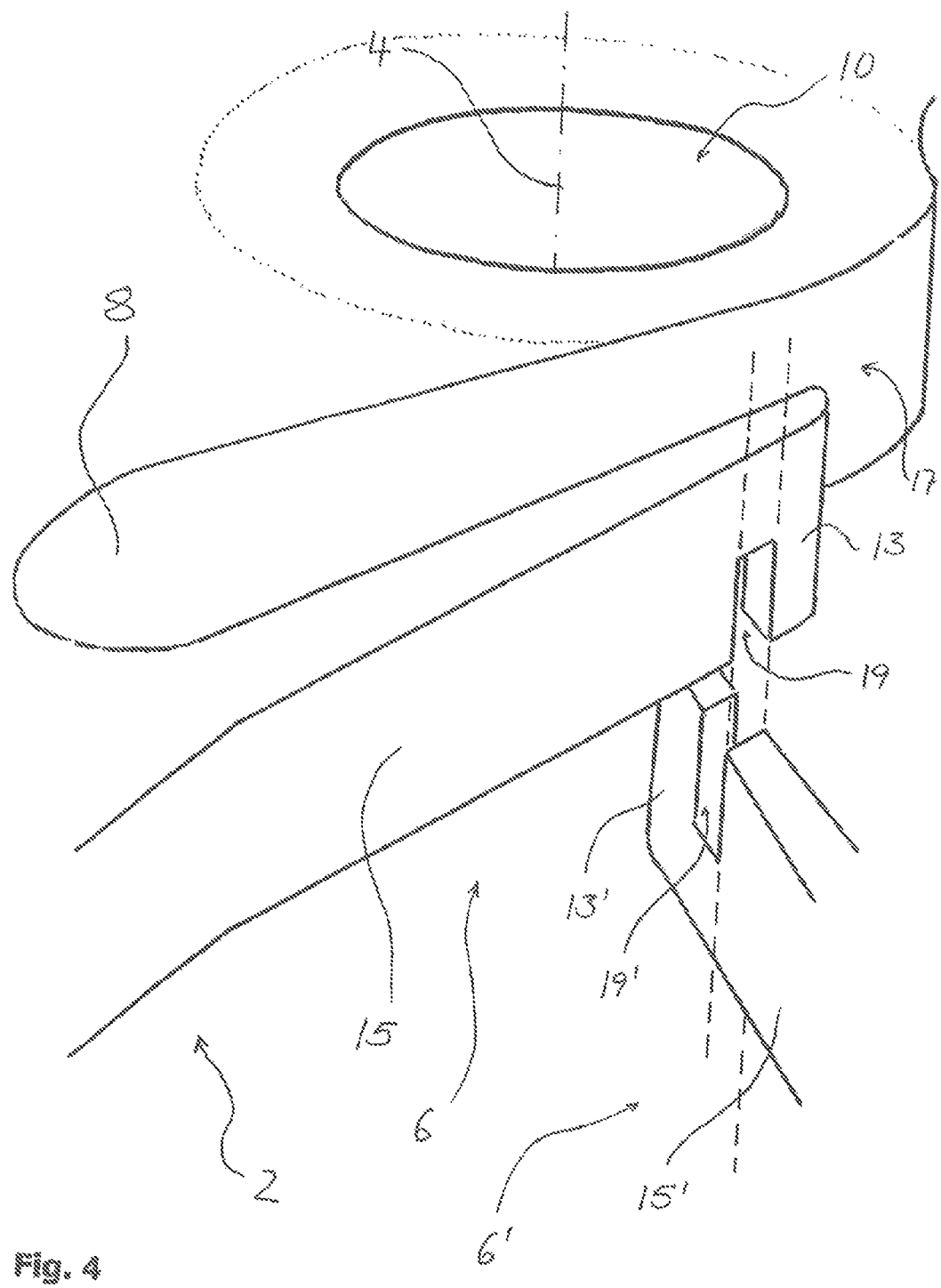

A preferential exemplary embodiment of the inventive gripper arm will be described and explained in detail on the basis of the following drawings, which show:

FIG. 1 a technical drawing of the upper side of an inventive gripper arm;

FIG. 2 a technical drawing of a gripping device with the inventive gripper arms from FIG. 1;

FIG. 3 a perspective view of the gripping device from FIG. 2, both in an exploded view as well as in assembled state; and FIG. 4 a depiction of the spring tongues in a further configuration of an inventive gripper arm from FIG. 1/FIG.

2 and a gripper arm from FIG. 2 of mirror-inverted configuration suited to cross-lap joinery.

A gripper arm 2 according to the invention is depicted in the perspective view of FIG. 1.

The gripper arm 2 is preferably of oblong shape and is divided into a front section 12 and a end section 14. The gripper arm 2 is intended for a device for gripping, holding and guiding in particular bottle-like containers which comprises a—not depicted here—rotatably mounted control cam for moving a gripping section 5 of the gripper arm 2 from an open position into a gripping position. A bore 10 for supporting a—not depicted here—bearing pin is arranged between the two sections 12 and 14 or respectively lies at the boundary between the two sections for the pivotable fixing of the gripper arm 2 in the device. A spring tongue 6 is configured in the front section 12 as an opening means for moving the gripping section 5 of the gripper arm 2 from the gripping position into the open position. A recess 8 is configured between the spring tongue 6 and the gripper arm 2, in particular the front section 12, which is open to the end piece of the spring tongue 6 toward the side of the gripper arm 2. This opening has a width, which essentially defines the maximum deflection of the spring tongue 2 to the gripper arm 2. The gripping and holding of a container is enabled for the gripping device by gripping section 5 interacting with a gripping section of a—not depicted here—second gripper arm of mirror-inverted configuration. A spring bar 16 is configured in the end section 14 for the cushioning and compensating of the force and/or deflection exerted on the gripper arm 2 via the control cam. The spring bar 16 is thereby integrally formed in an end section 14 of the gripper arm body. The spring bar 16 forms a closed recess 9 with the end section 14 which provides the spring bar 16 with the space needed for the spring travel or elastic deflection respectively. The gripper arm 2 is produced as one piece from plastic, preferably fiber-reinforced polyetheretherketone. The gripping section 5 exhibits a tapered and stepped profile from a lower side to an upper side of the gripper arm 2. The bore 10 corresponds to a continuous drill hole from the upper side to the lower side of the gripper arm 2, has a circular cross section, and defines a pivot axis 4 which corresponds to a symmetrical axis of the bore 10. The pivot axis 4 thereby runs perpendicular to the upper side and lower side. Apart from the opening means 6, the gripper arm 2 can be integrally produced from plastic in an injection molding process.

FIG. 2 shows a technical drawing of a gripping device with the inventive gripper arms from FIG. 1.

In addition to the gripper arm pair of gripper arms 2, 3, the control cam 11 is also shown as a control means, in particular closure means, which is rotatably mounted in a support element 18 and arranged between the end sections, in particular the spring bars, of the gripper arm pair. The gripper arms 2, 3 are rotatably mounted by way of fixing bolts and secured to the support element 18. The drawing shows both the gripping position as well as the open position of the gripping device. In the gripping position, the spring tongues 6 of the gripper arms 2, 3 interact and thereby elastically bend or respectively exert a force on each other due to the deflection. As soon as the force of the control cam 11 no longer acts on the end section of the gripper arms 2, 3, the spring tongues 6, 6' push away from each other so as to be able to re-assume their originally straight form again.

FIG. 3 shows a perspective view of the gripping device from FIG. 2, both in an exploded view as well as in assembled state. Additionally recognizable in the support element 18 are the recesses into which the control cam 11 and the fixing bolts 20 can be inserted. The fixing bolts 20 have a thread at the lower part for fixing in the support element 18, a cylindrical form in the middle area as a support for the bore of the gripper arm 2, 3, and a bolt head at the upper part.

FIG. 4 shows a depiction of the spring tongues 6, 6' as an advantageous configuration of an inventive gripper arm 2 from FIG. 1 or FIG. 2 and a gripper arm 3 from FIG. 2 of mirror-inverted configuration which are suitable for coming into operative engagement in the form of a cross-lap joint. By means of the operative engagement, the spring tongues 6, 6' are always joined together and can act as closure means. A respective notch/cut 19, 19' is in each case configured in the end pieces 13, 13' of the spring tongues 6, 6'. The width of the notch 19 in the direction of the spring tongue ridge 15 length corresponds to the thickness/depth of the end piece 13' or respectively notch 19' perpendicular to the direction of the spring tongue ridge 15' length (see the parallel dashed lines). The same applies conversely to the width of notch 19'. Since the spring tongues 6, 6' are configured identically and mirror-inverted to each other and the notches 19, 19' are formed at the same position in the spring tongue 6, 6', the thickness and width of the notches 19, 19' are in this case the same size and, respectively, the surface area of the notches 19, 19' is square-shaped.

| FIG. 1 dimensions | | FIG. 2 dimensions | |
|---|---|---|---|
| r | 135.47 mm | a | 90 mm |
| s | 64.53 mm | b | 33.2 mm |
| t | 71 mm | c | 57 mm |
| u | 50.36 mm | d | 72 mm |
| v | 10.19 mm | | |
| w | 6.7 mm | | |
| x | 1.2 mm | | |
| y | 2.8 mm | | |
| z | 1.21 mm | | |

LIST OF REFERENCE NUMERALS 1 gripping device
2 gripper arm
3 mirror-inverted gripper arm
4 pivot axis of gripper arm
5 gripping section
6 spring tongue of gripper arm 2
6' spring tongue of gripper arm 3
7 control axis
8 recess for spring tongue
9 recess for spring tongue
10 bore
11 control cam
12 front section
13 end piece of spring tongue 6
13' end piece of spring tongue 6'
14 end section
15 spring tongue ridge of spring tongue 6
15' spring tongue ridge of spring tongue 6'
16 spring bar
17 side surface of gripper arm 2
18 support element
19 notch/cut of spring tongue 6
19' notch/cut of spring tongue 6'
20 fixing bolt

What is claimed:

1. A device comprising:
a first gripper arm having a gripping section for gripping, holding and guiding containers responsive to a force moving the gripping section from an open position into a gripping position and vice versa;
a bore included in the first gripper arm to support a bearing pin for pivotably fixing the first gripper arm to the device; and
a first spring tongue integrally formed on the first gripper arm to form part of an energy store for moving the gripping section from the gripping position into the open position and vice versa, wherein the first spring tongue is elastically deflectable and operatively engages with a second spring tongue of a second gripper arm, wherein the first spring tongue includes a first end piece and a spring tongue ridge that tapers to the first end piece, the second gripper arm in a mirror-inverted configuration with the first gripper arm.

2. The device of claim 1, wherein the first end piece is configured to operatively engage with a second end piece of the second spring tongue, and wherein the operative engagement with the second end piece is in a form of a cross-lap joint.

3. The device of claim 1, wherein the first end piece is spaced at a distance from a side surface of the first gripper arm facing the second gripper arm when the first spring tongue is in a non-deflected state.

4. A device comprising:
a first gripper arm having a gripping section for gripping, holding and guiding containers responsive to a force moving the gripping section from an open position into a gripping position and vice versa;
a bore included in the first gripper arm to support a bearing pin for pivotably fixing the first gripper arm to the device; and
a first spring tongue integrally formed on the first gripper arm to form part of an energy store for moving the gripping section from the gripping position into the open position and vice versa, wherein the first spring tongue is elastically deflectable and operatively engages with a second spring tongue of a second gripper arm, wherein the first spring tongue has substantially a same width in an axial direction of the bore as the first gripper arm, the second gripper arm in a mirror-inverted configuration with the first gripper arm.

5. The device of claim 1, wherein a portion of the energy store is configured between the bore and the gripping section.

6. The device of claim 1, wherein the energy store is configured between the bore and an end section of the first gripper arm.

7. A device comprising:
a first gripper arm having a gripping section for gripping, holding and guiding containers responsive to a force moving the gripping section from an open position into a gripping position and vice versa, wherein the force is exerted by a control cam;
a bore included in the first gripper arm to support a bearing pin for pivotably fixing the first gripper arm to the device; and
a first spring tongue integrally formed on the first gripper arm to form part of an energy store for moving the gripping section from the gripping position into the open position and vice versa, wherein the first spring tongue is elastically deflectable and operatively engages with a second spring tongue of a second gripper arm, the second gripper arm in a mirror-inverted configuration with the first gripper arm.

8. A device comprising
a first gripper arm having a gripping section for gripping, holding and guiding containers responsive to a force moving the gripping section from an open position into a gripping position and vice versa, wherein the gripping section further includes one of a tapered profile and a step profile from a lower side to an upper side of the first gripper arm;
a bore included in the first gripper arm to support a bearing pin for pivotably fixing the first gripper arm to the device; and
a first spring tongue integrally formed on the first gripper arm to form part of an energy store for moving the gripping section from the gripping position into the open position and vice versa wherein the first spring tongue is elastically deflectable and operatively engages with a second spring tongue of a second gripper arm, the second gripper arm in a mirror-inverted configuration with the first gripper arm.

9. A device comprising:
a first gripper arm having a gripping section for gripping, holding and guiding containers responsive to a force moving the gripping section from an open position into a gripping position and vice versa;
a bore included in the first gripper arm to support a bearing pin for pivotably fixing the first gripper arm to the device; and
a first spring tongue integrally formed on the first gripper arm to form part of an energy store for moving the gripping section from the gripping position into the open position and vice versa, wherein the first spring tongue is elastically deflectable and operatively engages with a second spring tongue of a second gripper arm, wherein the first gripper arm further includes an integrally formed spring bar that is elastically deflectable to compensate for the force exerted during moving the gripping section of the first gripper arm, wherein the spring bar forms a closed circumferential recess with the first gripper arm, the second gripper arm in a mirror-inverted configuration with the first gripper arm.

10. An apparatus comprising:
a first gripper arm having a gripping section for gripping, holding and guiding containers responsive to a force exerted by a control cam moving the gripping section from an open position into a gripping position and vice versa;
a bore included in the first gripper arm to support a bearing pin for pivotably fixing the first gripper arm to the apparatus;
a first spring tongue integrally formed on the first gripper arm to form part of an energy store for moving the gripping section from the gripping position into the open position and vice versa, wherein the first spring tongue is elastically deflectable and operatively engages with a second spring tongue of a second gripper arm, the second gripper arm in a mirror-inverted configuration with the first gripper arm; and
a first end piece of the first spring tongue and configured to operatively engage with a second end piece of the second spring tongue, wherein the operative engagement with the second end piece is in a form of a cross-lap joint.

11. The apparatus of claim 10, wherein the first spring tongue further comprises a spring tongue ridge that tapers to the first end piece.

12. The apparatus of claim 10, wherein the first spring tongue has substantially a same width in an axial direction of the bore as the first gripper arm.

13. The apparatus of claim 10, wherein the first end piece is spaced at a distance from a side surface of the first gripper arm facing the second gripper arm when the first spring tongue is in a relaxed state.

14. The apparatus of claim 10, wherein the energy store is configured between the bore and an end section of the first gripper arm and between the bore and the gripping section of the first gripper arm.

15. The apparatus of claim 10, wherein the first gripper arm is fiber-reinforced plastic.

16. The apparatus of claim 10, wherein the gripping section further comprises one of a tapered profile and a step profile from a lower side to an upper side of the first gripper arm.

17. The apparatus of claim 10, wherein the first gripper arm further comprises an integrally formed spring bar that is elastically deflectable to compensate for the force exerted during moving the gripping section of the first gripper arm, wherein the spring bar forms a closed circumferential recess with the first gripper arm.

18. An apparatus comprising:
a pair of gripper arms in a mirror-inverted configuration, each gripper arm having a gripping section for gripping, holding and guiding containers;
a bore included in each gripper arm to support a bearing pin for pivotably fixing the respective gripper arm to the apparatus;
a control cam affixed to the gripper arms for moving the gripping section from an open position into a gripping position and vice-versa; and
a spring tongue integrally formed on each gripper arm to form part of an energy store for moving the gripping section of the respective gripper arm from the gripping position into the open position and vice versa, wherein the spring tongues are elastically deflectable and operatively engage with each other, and wherein the operative engagement is in a form of a cross-lap joint.

19. The apparatus of claim 18, wherein each gripper arm further comprises an integrally formed spring bar that is elastically deflectable to compensate for a force exerted during moving the gripping section of the respective gripper arm, and wherein the respective spring bar forms a closed circumferential recess with the respective gripper arm.

* * * * *